United States Patent [19]
Ross et al.

[11] Patent Number: 4,602,809
[45] Date of Patent: Jul. 29, 1986

[54] MINIATURE O-RINGLESS GAS LINE ISOLATOR

[75] Inventors: Oakley G. Ross, Paso Robles; Mark L. Kline, Fullerton; Johnny R. Vieyra, Montclair, all of Calif.

[73] Assignee: General Dynamics, Pomona Division, Pomona, Calif.

[21] Appl. No.: 673,696

[22] Filed: Nov. 21, 1984

[51] Int. Cl.[4] .................................................. F16L 59/02
[52] U.S. Cl. ........................................ 285/50; 285/52; 285/54; 285/109; 285/113; 285/385; 285/389; 285/354; 285/904
[58] Field of Search ............... 285/50, 52, 54, DIG. 5, 285/108, 109, 113, 386, 389, 384, 385, 386, DIG. 19, 328, 354

[56] References Cited

U.S. PATENT DOCUMENTS

| 371,598 | 10/1887 | Landis | 285/328 |
|---|---|---|---|
| 553,844 | 2/1896 | Duntley | 285/52 |
| 554,332 | 2/1896 | Carson | 285/52 |
| 604,159 | 5/1898 | Phelps, Jr. | 285/328 |
| 755,442 | 3/1904 | Brickell | 285/DIG. 19 |
| 1,248,275 | 11/1917 | Crowe | 285/DIG. 19 |
| 1,595,310 | 8/1926 | Mueller et al. | 285/328 |
| 1,834,581 | 12/1931 | Ferrell et al. | 285/328 |
| 2,407,076 | 9/1946 | Harkness | 285/DIG. 19 |
| 2,507,261 | 5/1950 | Mercier | 285/DIG. 19 |
| 2,535,694 | 7/1946 | Payne | 285/DIG. 19 |
| 2,570,224 | 1/1949 | Fason | 285/DIG. 19 |
| 2,627,580 | 2/1953 | Picard | 285/DIG. 19 |
| 2,669,465 | 2/1954 | Newell | 285/52 |
| 2,703,719 | 3/1955 | Crothers | 285/DIG. 19 |
| 2,837,351 | 6/1958 | Bailey | 285/328 |
| 2,900,199 | 8/1959 | Logan | 285/DIG. 19 |
| 2,950,928 | 8/1960 | Bowan | 285/DIG. 20 |
| 3,091,483 | 5/1963 | Hruby, Jr. | 285/DIG. 19 |
| 3,239,247 | 3/1966 | Pickert | 285/113 |
| 3,284,112 | 11/1966 | Martin | 285/328 |
| 3,382,563 | 5/1968 | Barroil et al. | 285/54 |
| 3,482,860 | 12/1969 | Dawbarn et al. | 285/386 |
| 3,612,578 | 10/1971 | Bagnulo | 285/50 |
| 3,712,055 | 1/1973 | McCabe | 285/DIG. 19 |
| 4,254,973 | 3/1981 | Benjamin | 285/328 |

FOREIGN PATENT DOCUMENTS

| 103968 | 5/1937 | Australia | 285/52 |
|---|---|---|---|
| 199957 | 10/1958 | Austria | 285/DIG. 19 |
| 105304 | 10/1959 | Denmark . | |
| 1429101 | 1/1969 | Fed. Rep. of Germany | 285/50 |
| 1330464 | 10/1963 | France | 285/DIG. 19 |
| 841 | of 1885 | United Kingdom | 285/384 |
| 588781 | 6/1947 | United Kingdom | 285/328 |
| 842233 | 7/1958 | United Kingdom . | |
| 1201858 | 8/1970 | United Kingdom | 285/54 |

Primary Examiner—Cornelius J. Husar
Assistant Examiner—Eric K. Nicholson
Attorney, Agent, or Firm—Neil F. Martin; Loyal M. Hansen; Edward B. Johnson

[57] ABSTRACT

A separable electrical isolator for coupling two pieces of conductive tubing carrying high pressure cryogenic gas includes a gas-impervious dielectric spacer with a bore in which the pieces of tubing are sealed axially-aligned in fluid communication with an electrically-nonconductive gap between them. A pair of complementary coupling members are rigidly attached to the pieces of tubing to define outwardly-extending annular flanges that are each sealed about the periphery of a corresponding one of the pieces in a position slightly set back from an end of the piece. Each flange has an annular rib protruding from it toward the end of the piece. The coupling members are separably and nonconductively interconnected with the annular ribs applying compressive force to the spacer to thereby effect the seal.

12 Claims, 3 Drawing Figures

MINIATURE O-RINGLESS GAS LINE ISOLATOR

BACKGROUND OF THE INVENTION

This invention relates in general to electrical insulators, and pertains particularly to an isolator for electrically decoupling two conductive sections of tubing.

Isolators for coupling two conductive sections of tubing with an electrically-nonconductive joint exist in the prior art. However, present day technology requirements place severe design constraints on such isolators that were not present or provided for in the past.

For example, an infrared detector, such as may be used as part of an infrared seeker or scanner in helicopters or air-to-ground missiles, must be cool in order to develop maximum sensitivity. Metal tubing is often used to deliver a cooling gas to the detector, and since the tubing may couple stray electrical signals to the detector and cause it to malfunction, an isolator is desired. Inserting an isolator in the metal tubing line decreases coupling of stray signals and the probability of detector malfunctioning.

The high pressure of up to 7,000 pounds-per-square inch and more, along with the temperatures in the range of $-423$ degrees Fahrenheit that characterize the cooling gas employed, make existing isolators inadequate for this purpose.

Therefore, it is desirable to have an isolator for electrically isolating two conductive sections of line that can withstand high pressure cryogenic gas. And, it is desirable that the coupler be separable, relatively small and lightweight, and insertable in an existing line.

SUMMARY OF THE INVENTION

This invention provides a new and improved separable isolator for coupling two pieces of conductive tubing with an electrically-isolating joint that can withstand high pressure cryogenic gas.

An exemplary embodiment of the isolator includes a pair of complementary coupling members attached to the pieces of tubing, each coupling member being rigidly attached to a corresponding one of the pieces to define an outwardly-extending annular flange. Each annular flange is sealed about the periphery of the corresponding piece in a position slightly set back from an end of the corresponding piece, and each annular flange has an annular rib protruding from it toward the end of the piece.

A gas-impervious dielectric spacer is provided between the annular flanges. The spacer has two opposing surfaces, each of which faces a separate one of the annular ribs, and a bore extending therebetween into which the tubing ends extend. The spacer has a width between the two opposing surfaces sufficient to prevent contact between the tubing ends.

The coupling members are nonconductively interconnected to apply compressive force to the spacer with the ribs and thereby seal the tubing ends in fluid communication while at the same time maintaining them electrically isolated.

Other features and many attendant advantages of the invention will become more apparent upon a reading of the detailed description together with the drawings, wherein like reference numerals refer to like parts throughout.

DETAILED DESCRIPTION

Figure 1:
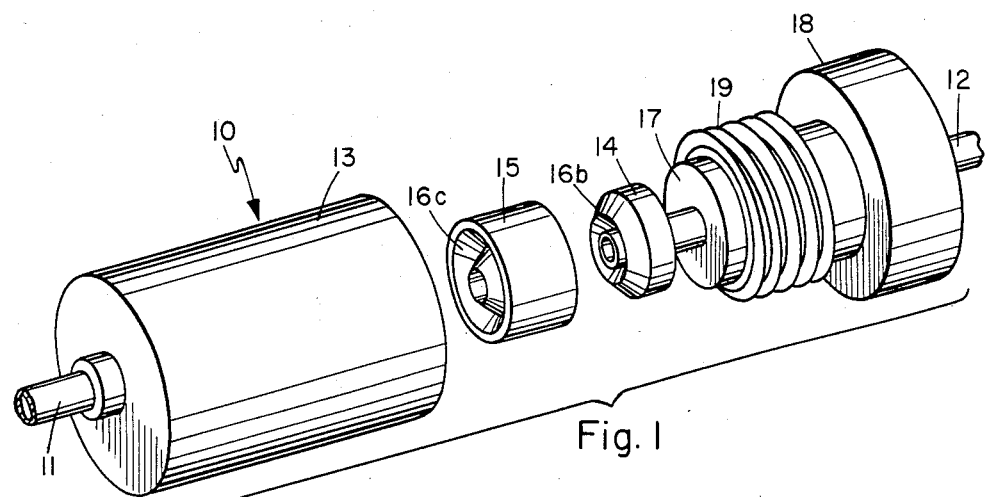
FIG. 1 is an exploded perspective view of an exemplary embodiment of a isolator constructed in accordance with the invention.
Figure 2:
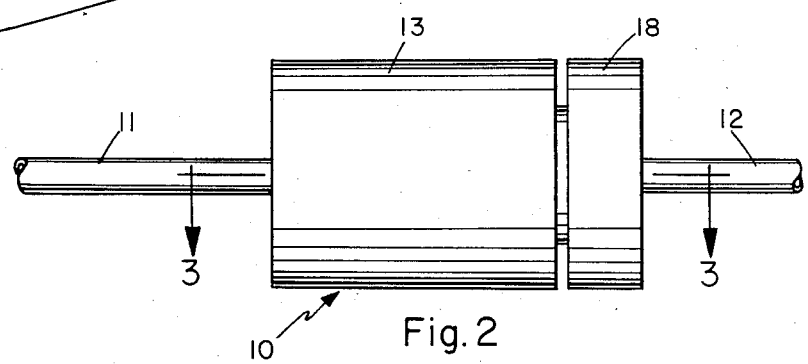
FIG. 2 is a side elevation view of the assembled isolator.
Figure 3:
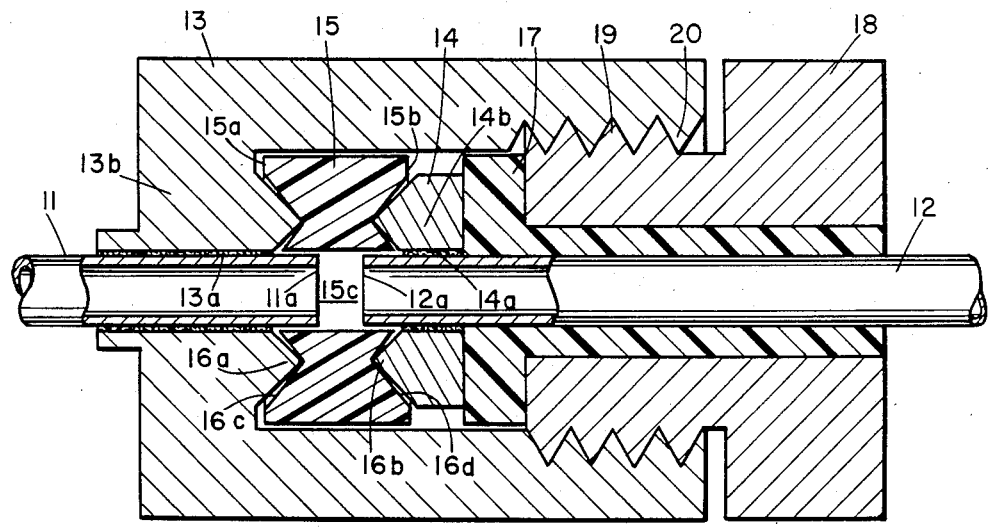
FIG. 3 is an enlarged sectional view taken on line 3—3 of FIG. 2.

An exemplary embodiment of a separable electrical isolator constructed in accordance with the invention is shown in FIGS. 1-3. It is referred to generally by reference numeral 10 in FIG. 1 where it is shown in place on two pieces of tubing, tubing 11 and tubing 12.

A first coupling member, socket 13, is attached to tubing 11, and a second coupling member, plug 14, is attached to tubing 12. Dielectric spacer 15 is included and assembled between the socket and plug as illustrated.

The coupling members have annular ribs protruding from them, rib 16b being visible in FIG. 1. The spacer of the illustrated embodiment includes mating grooves, groove 16c being visible in FIG. 1.

Dielectric washer 17 and a cap 18 are utilized to nonconductively interconnect the socket and plug with the dielectric spacer compressed in between. Exterior threads 19 on cap 18 mate with interior threads within socket 13 (not visible in FIG. 1) to separably engage the socket with the cap for this purpose. By screwing the cap and the socket together with the components assembled as illustrated, the tubing ends are sealed within the dielectric spacer with a nonconductive gap between them.

The assembled isolator is shown in FIG. 2, and further details are shown in the enlarged sectional view of FIG. 3.

Tubing 11 and tubing 12 represent stainless steel tubing having an inside diameter of approximately 0.04 inch, such as may typically be used to carry high pressure cryogenic gas to an infrared detector. Socket 13 is also composed of stainless steel material. It is rigidly attached to tubing 11 by suitable means such as brazing, brazing 13a illustrating this aspect in FIG. 3.

Socket 13 defines a first annular flange. This outwardly-extending flange portion of the socket member is designated in FIG. 3 by reference numeral 13b. It is sealed about the periphery of tubing 11 by virtue of brazing 13a, and it extends radially-outward with respect to the periphery of tubing 11 in a position slightly set back from an end of tubing 11, tubing end 11a.

Flange 13b includes a first annular rib, rib 16a, which protrudes from the flange toward tubing end 11a. The flange and rib are of unitary construction, and serve to apply compressive forces to the spacer.

Plug 14 is rigidly attached to the other piece of tubing, tubing 12, by suitable means such as brazing, of which brazing 14a is illustrative in FIG. 3. Plug 14 is composed of stainless steel, also. It defines a second annular flange. This outwardly-extending flange is designated by reference numeral 14b. It is sealed about the periphery of tubing 12 by virtue of brazing 14a, and it extends radially-outward with respect to the periphery of tubing 12 in a position slightly set back from an end of tubing 12, tubing end 12a. It includes a second annular rib, rib 16b, which protrudes from the flange toward tubing end 12a. Flange 14b and rib 16b are also of unitary construction, and they too apply compressive forces to the spacer.

Socket 13 and plug 14 constitute complementary coupling members in the sense that they fit together and cooperate to compress a dielectric spacer in between with the tubing ends sealed within.

Dielectric spacer 15 is employed (FIG. 3). It is located in between the two annular flanges defined by socket 13 and plug 14. Spacer 15 is composed of a gas-impervious dielectric material, such as manufactured by Dupont under the tradename DELRIN, that can withstand high pressure cryogenic gas while maintaining the tubing ends sealed within by means of compressive force applied by the annular ribs.

The dielectric spacer has two opposing surfaces, spacer surface 15a and spacer surface 15b, together with a bore extending therebetween, bore 15c. The bore has a cross section large enough so that the tubing ends fit into it axially-aligned in an approximate sense, and the spacer has a thickness between the two opposing spacer surfaces sufficient to prevent the tubing ends from contacting each other.

The illustrated spacer also includes an annular groove in each spacer surface, grooves 16c and 16d in FIG. 3. Each groove mates generally with a corresponding one of the annular ribs, groove 16c with rib 16a and groove 16d with rib 16b. The grooves serve to guide the spacer into the appropriate position during assembly.

When fully assembled, the annular ribs compress the spacer to effect a seal, and the tubing ends are thereby sealed in fluid communication within the spacer.

The invention includes means for separably and nonconductively connecting the coupling members together to compress the dielectric spacer. In the illustrated embodiment the coupling members are interconnected and the two annular ribs compressed against the spacer with the aid of a washer and screw-on cap.

As shown in FIG. 3, dielectric washer 17 and cap 18 cooperate to nonconductively secure plug 14 within socket 13 with the dielectric spacer compressed in between. Dielectric washer 17 serves to nonconductively transmit compressive forces from cap 18 to the plug, and in the illustrated embodiment it also serves as a nonconductive bushing between cap 18 and tubing 12.

Cap 18 is provided with exterior threads 19 which mate with interior threads 20 on socket 13. The cap can be screwed into the socket thereby to separably and nonconductively retain the plug within the socket with the tubing ends sealed within the dielectric spacer.

Thus, this invention uses compressive force to separably seal the tubing ends within the spacer, with the bore of the spacer serving to channel fluid between the tubing ends and thereby maintain them in fluid communication. A potential leakage path exists along the bore, however, between the spacer and the tubing, as depicted in FIG. 3 by the space along the bore between the spacer and the tubing. This longitudinally-extending leakage path is difficult to seal by compressing the spacer against the tubing. To compress the spacer against the tubing would require the application of forces perpendicular to the longitudinally-extending leakage path. Such forces would be radially-directed wth respect to the tubing and relatively difficult to apply as they may crush or otherwise damage the tubing.

With the isolator of this invention, the longitudinally-extending leakage path along the bore is redirected by the annular flange portion of each coupling member to the radially-extending leakage paths between the annular flanges and facing spacer surfaces. The radially-extending leakage paths are more easily sealed by compression. They may be sealed by the application of opposing forces directed generally parallel to the longitudinal axis of the tubing. Such longitudinally-directed forces may be increased in magnitude sufficiently to compress and seal the leakage paths with relative ease without damaging the tubing.

It is conceivable to compress O-ring seals between the spacer and annular flanges to effect a seal. However, this invention compresses the spacer between the annular ribs without the need for O-ring seals. The annular ribs are shaped to reduce the area of contact between the ribs and the spacer and increase the pressure per unit area applied to the spacer.

The illustrated ribs each have a triangular cross section for this purpose with an apex that abuts the spacer (FIG. 3). And, with a spacer that is composed of a relatively hard substance such as DELRIN, an effective seal results that will withstand high pressure and low temperatures. Accordingly, the pair of coupling members of this invention combine with the gas-impervious dielectric spacer and the protruding annular ribs to achieve a separable electrical isolator sealed without O-rings that is suitable for use with high pressure cryogenic gas.

As various changes may be made in the form, construction, and arrangement of the parts herein, without departing from the spirit and scope of the invention and without sacrificing any of its advantages, it is to be understood that all matter herein is to be interpreted as illustrative and not in any limiting sense.

What is claimed is:

1. A separable electrical isolator for releasably coupling together two pieces of conductive tubing carrying high pressure cryogenic gas, which comprises:
   two pieces of tubing;
   a pair of complementary coupling members releasably secured together, each coupling member being rigidly attached to a corresponding one of the pieces of tubing to define an outwardly extending annular flange sealed about the periphery of the corresponding piece of tubing in a position slightly set back from an end of the piece;
   a pair of annular ribs, each one of the annular ribs protruding from a corresponding one of the annular flanges toward the end of the piece of tubing to which that annular flange is attached;
   a gas-impervious dielectric spacer between the coupling members, the spacer having a pair of opposing surfaces facing the annular ribs and a bore extending therebetween into which the tubing ends extend axially aligned without contacting each other; and
   means for releasably and nonconductively connecting the coupling members together to apply compressive force to the spacer with the annular ribs and thereby seal the tubing ends in fluid communication with an electrically nonconductive gap between them.

2. The device recited in claim 1 wherein one of the coupling members is a hollow socket member and the other coupling member is a plug member that fits within the socket member.

3. The device recited in claim 2 wherein the connecting means includes a threaded cap for threaded engagement of the socket member.

4. The device recited in claim 3 which includes a dielectric washer between the cap and the plug member to nonconductively transmit compressive forces from the cap to the plug member.

5. The device recited in claim 1 wherein the spacer is a generally disc-shaped member of nylon composition.

6. The device recited in claim 1 wherein the annular ribs each have a generally triangular cross section with an apex extending toward the tubing end.

7. The device recited in claim 1 wherein each rib and the corresponding annular flange are of unitary construction.

8. The device recited in claim 1, wherein the opposing spacer surfaces each have a preformed annular groove for mating engagement with a corresponding one of the annular ribs to guide the spacer into position during assembly.

9. The device recited in claim 1 wherein the coupling members are each composed of a stainless steel alloy.

10. The device recited in claim 1 wherein the coupling members are rigidly attached to the pieces of tubing by brazing.

11. An electrical isolator for coupling the ends of two pieces of conductive tubing, comprising:
   two pieces of tubing;
   a pair of complementary coupling members, each coupling member being rigidly attached to a corresponding one of the pieces of tubing to define an outwardly extending annular flange sealed about the periphery of the corresponding piece of tubing in a position set back from an end of the piece;
   each annular flange having an annular ridge protruding from its surface in the direction of the end of the piece of tubing to which that annular flange is attached;
   a gas-impervious dielectric spacer between the coupling members, the spacer having a pair of opposing surfaces each having a preformed annular groove facing the annular ridge in the annular flange facing that spacer surface, the grooves comprising means for mating engagement with the respective annular ridge, and the spacer having a bore extending between the opposing surfaces into which the tubing ends extend in axial alignment without contacting each other; and
   means for releasably and nonconductively connecting the coupling members together, comprising a cap member having connecting means for releasable engagement with one of the coupling members, the cap member and said one coupling member having complementary coupling means for releasably securing the cap member to said one coupling member, and means for trapping the other coupling member between the cap member and said one coupling member to seal the tubing ends in fluid communication with an electrically non-conductive gap between them.

12. The device as claimed in claim 11, wherein said one coupling member comprises a socket member and said other coupling member comprises a plug member which fits within the socket member, and said cap member comprises a sleeve member having a central bore engaging over the piece of tubing to which the plug member is attached to trap the plug member between the sleeve member and the inner end of the socket member, the device further including a dielectric washer between the sleeve member and the plug member for non-conductively transmitting compressive forces from the sleeve member to the plug member, the dielectric washer having a hollow stem portion projecting into the sleeve member bore to space the sleeve member from the piece of tubing over which it is engaged.

* * * * *